(12) United States Patent
Rezaeieh et al.

(10) Patent No.: US 12,164,117 B2
(45) Date of Patent: Dec. 10, 2024

(54) APPARATUS FOR ELECTROMAGNETIC CHARACTERISATION OF INTERNAL FEATURES OF AN OBJECT AND A PROCESS FOR PRODUCING THE APPARATUS

(71) Applicant: EMvision Medical Devices Ltd, Brisbane (AU)

(72) Inventors: Sasan Ahdi Rezaeieh, St Lucia (AU); Amin Darvazehban, St Lucia (AU); Mojtaba Khosravi-Farsani, St Lucia (AU); Amin M. Abbosh, St Lucia (AU)

(73) Assignee: EMvision Medical Devices Ltd, Brisbane (AU)

( * ) Notice: Subject to any disclaimer, the term of this patent is extended or adjusted under 35 U.S.C. 154(b) by 40 days.

(21) Appl. No.: 18/002,575

(22) PCT Filed: Jul. 23, 2021

(86) PCT No.: PCT/AU2021/050800
§ 371 (c)(1),
(2) Date: Dec. 20, 2022

(87) PCT Pub. No.: WO2022/016233
PCT Pub. Date: Jan. 27, 2022

(65) Prior Publication Data
US 2023/0228917 A1    Jul. 20, 2023

(30) Foreign Application Priority Data

Jul. 24, 2020  (AU) ................................ 2020902597

(51) Int. Cl.
*G02B 3/00*    (2006.01)
*G02B 3/12*    (2006.01)
*H01Q 3/46*   (2006.01)

(52) U.S. Cl.
CPC ......... *G02B 3/0087* (2013.01); *G02B 3/0043* (2013.01); *G02B 3/12* (2013.01); *H01Q 3/46* (2013.01)

(58) Field of Classification Search
CPC ......... H01Q 3/44–46; H01Q 15/02–08; G02B 3/00; G02B 3/12
See application file for complete search history.

(56) References Cited

U.S. PATENT DOCUMENTS

| | | | |
|---|---|---|---|
| 10,700,437 B2 * | 6/2020 | Song | ...................... H01Q 15/04 |
| 2011/0069377 A1 | 3/2011 | Wu et al. | |
| 2013/0229704 A1 | 9/2013 | Smolyaninov | |

OTHER PUBLICATIONS

International Search Report issued for International Patent Application No. PCT/AU2021/050800, dated Sep. 29, 2021, in 4 pages.

(Continued)

*Primary Examiner* — Hasan Islam
(74) *Attorney, Agent, or Firm* — Knobbe Martens, Olson & Bear, LLP (57) ABSTRACT

An apparatus for electromagnetic characterisation of internal features of an object, including a lens for placement between a source of electromagnetic energy and the object, the lens being composed of a first material having a first permittivity with openings therein containing or configured to receive one or more second materials having respective second permittivities different to the first permittivity, the openings being configured such that, when the openings contain the one or more second materials, the lens has a graded refractive index wherein an electromagnetic wave generated by the source and incident upon a first surface of the lens as a spherical wave exits a second surface of the lens in contact with a receiving surface of the object substantially as a plane wave, and a refractive index of the lens at the second surface of the lens substantially matches a refractive (Continued)

index of the object at the receiving surface to increase penetration of the plane wave into the object.

17 Claims, 9 Drawing Sheets

(56) References Cited

OTHER PUBLICATIONS

Optica, https://www.optica.org/en-us/about/newsroom/news_releases/2012/human_eye_gives_researchers_visionary_design_for_n/ printed Jun. 16, 2023, in 3 pages.
RP Photonics AG, https://www.rp-photonics.com/gradient_index_lenses.html printed Jun. 16, 2023, in 10 pages.
Wikipedia, Https://en-wikipedia.org/wiki.Gradient-index_optics printed Jun. 16, 2023, in 5 pages.
Extended European Search Report dated Sep. 3, 2024 for Application No. 21847030.0, 11 pages.
Imbert, et al., Design and Performance Evaluation of a Dielectric Flat Lens Antenna for Millimeter-Wave Applications, IEEE Antennas and Wireless Propagation Letters, vol. 14, 2015, 4 pages.
Papathanasopoulos, et al., "A Novel Collapsible Flat-Layered Metamaterial Gradient-Refractive-Index Lens Antenna," IEEE Transaction on Antennas and Propagation, vol. 68, No. 3, Mar. 2020, 10 pages.
Zhou, et al., "Three-dimensional large-aperture lens antennas with gradient refractive index," Science China Press and Springer-Verlag Berlin Heidelberg 2013, 12 pages.
Headland, et al., "Beam deflection lens at terahertz frequencies using a hole lattice metamaterial," 2013 38$^{th}$ International Conference on Infrared, Millimeter, and Terahertz Waves (IRMMW-THZ), Sep. 1, 2013, pp. 1-2, XP093194376.

\* cited by examiner

APPARATUS FOR ELECTROMAGNETIC CHARACTERISATION OF INTERNAL FEATURES OF AN OBJECT AND A PROCESS FOR PRODUCING THE APPARATUS

TECHNICAL FIELD

The present invention relates to electromagnetic characterisation of materials, and in particular to an apparatus for electromagnetic characterisation of internal features of an object, and a process for producing the apparatus.

BACKGROUND

The phrase "non-destructive testing" (or "NDT") refers to methods of evaluating characteristics of a material or object without damaging it. NDT is widely used in many different industries, including for example gas and oil, aerospace, farming and healthcare. For instance, NDT can be used to image the inner material of a glass-fibre reinforced polymer, test the defects inside railroad wheels, evaluate the status of non-metallic pipes, diagnose breast cancer, brain injuries, or for general human body imaging. In particular, by analysing the behaviour of waves reflected from internal features of an object (or transmitted through the object), these modalities are able to diagnose defects and/or assess changes in the object. An apparatus for NDT typically consists of hardware and software components. The hardware components may include a single antenna or an array of antennas (sensors) that transmit the wave (electromagnetic or acoustic waves) towards the medium and capture the transmitted or reflected ones. Any changes to the amplitude or phase of the signal, e.g. a shift in resonance frequency, is measured by the software component and processed to detect abnormalities in the object.

Ultrasonic testing ("UT") is regarded as the most widely used non-destructive testing method, involving the scattering of high frequency waves. While being effective, UT suffers from several disadvantages, including: 1) the probe head needs to be changed if features deeper within the object need to be detected, which adds to the cost of UT equipment; 2) UT requires a matching medium, e.g. a water-based gel, to avoid the mismatch between the transmission characteristics of the air and the object under test (incorrect or insufficient application of the matching gel is one of the main reasons for poor performance of UT systems); and 3) the need for the UT operator to maintain a constant beam along the test direction, which limits the practicality of this method to assess objects with curved surfaces. These challenges of UT and other industrial NDT systems are mainly due to a lack of accounting for the properties of the object under test. For instance, the same ultrasonic probe is used to test rots in wood, cracks in ceramics, and cement cancer. However, these materials have distinctive material characteristics that are quite different from each other, causing variable mismatches between the probe and the investigated medium that result in reduced transmitted power/penetration depth. To alleviate this problem, higher power signals are utilized, increasing testing cost and noise levels.

Electromagnetic medical imaging as a healthcare division of the NDT industry has attempted to alleviate this problem by utilizing customized matching media between the antennas and the human body, which is very lossy. However, the addition of a matching medium increases the complexity of the system in terms of increased weight, fluid leakage, and awkward positioning of antennas. Consequently, the practicality of this method is limited to very few applications such as breast cancer, where it is relatively straightforward for the imaged object to be directly located inside the matching medium. As an alternative solution, body-coupled and bio-matched antennas have been proposed. Unlike conventional antennas that are designed in free space, these antennas are designed for direct contact with the human body to minimise the mismatch between the antenna and the human body. While being effective, these antennas have compact apertures, and consequently the amount of energy they can radiate is limited. Increasing the size of the antenna to increase the penetration depth would also increase the illumination area, resulting in propagation of the signal to undesired neighbouring regions.

In view of the above, the inventors have identified a general need for structures that can bridge the gap between the antenna and the object under test without complicating the test setup or limiting its detection capabilities. It is desired, therefore, to overcome or alleviate one or more difficulties of the prior art, or to at least provide a useful alternative.

SUMMARY

In accordance with some embodiments of the present invention, there is provided an apparatus for electromagnetic characterisation of internal features of an object, including a lens for placement between a source of electromagnetic energy and the object, the lens being composed of a first material having a first permittivity with openings therein containing or configured to receive one or more second materials having respective second permittivities different to the first permittivity, the openings being configured such that, when the openings contain the one or more second materials, the lens has a graded refractive index wherein an electromagnetic wave generated by the source and incident upon a first surface of the lens as a spherical wave exits a second surface of the lens in contact with a receiving surface of the object substantially as a plane wave, and a refractive index of the lens at the second surface of the lens substantially matches a refractive index of the object at the receiving surface to increase penetration of the plane wave into the object.

The apparatus may include the source of electromagnetic energy.

The openings may contain the one or more second materials.

In some embodiments, the second surface of the lens has a non-planar shape that conforms to the receiving surface of the object.

In some embodiments, the one or more second materials include at least one material having a permittivity greater than the first permittivity.

In some embodiments, the one or more second materials include at least one material having a permittivity less than the first permittivity.

In some embodiments, the second materials are arranged in the openings so that the plane wave is deflected from its direction of incidence at the receiving surface of the object and travels along a different direction within the object.

The object may be a body part.

In some embodiments, the first material is a 3d printing material, and the one or more second materials include water.

In some embodiments, the openings in the first material are arranged in layers.

In some embodiments, the openings are cylindrical openings, and the cylindrical openings in each layer have the same corresponding radius, and the cylindrical openings in respective different layers have respective different radii.

In accordance with some embodiments of the present invention, there is provided a process for producing an apparatus for electromagnetic characterisation of internal features of an object, the process including forming a body of a first material with openings therein, the first material having a first permittivity and the openings being configured such that, when the openings contain one or more predetermined second materials having respective second permittivities different to the first permittivity, a resulting spatial configuration of permittivities forms a graded refractive index lens, wherein an electromagnetic wave incident upon a first surface of the lens as a spherical wave exits a second surface of the lens in contact with a receiving surface of the object substantially as a plane wave, and a refractive index of the lens at the second surface of the lens substantially matches a refractive index of the object at the receiving surface so that a matching medium is not required.

The process may include providing the source of electromagnetic energy.

The process may include introducing the one or more predetermined second materials into the openings in the first material.

The process may include introducing the one or more predetermined second materials into corresponding selected ones of the openings in the first material to direct the plane wave along a specific direction within the object.

In some embodiments, the process includes dynamically controlling the introduction and removal of the one or more predetermined second materials into and from corresponding selected ones of the openings in the first material to dynamically steer the plane wave along different directions within the object.

In some embodiments, the body of the first material is formed such that the second surface of the lens has a non-planar shape that conforms to the receiving surface of the object.

In some embodiments, the step of forming includes 3D printing the body of the first material with openings therein.

In some embodiments, the process includes determining the configuration of the openings using an optimisation process that maximises a transmission coefficient of the lens while minimising a reflection coefficient of the lens.

Also described herein is an apparatus for electromagnetic characterisation of internal features of an object, including:
 (i) a source of electromagnetic energy; and
 (ii) a lens for placement between the source and the object and in contact with the object, the lens being composed of a first material having a first permittivity with openings therein containing or configured to receive one or more second materials having respective second permittivities different to the first permittivity, the openings being configured such that, when the openings contain the one or more second materials, the lens has a graded refractive index wherein an electromagnetic wave generated by the source and incident upon a first surface of the lens as a spherical wave exits a second surface of the lens as a plane wave, and a corresponding refractive index of the lens at the second surface of the lens matches a corresponding refractive index of a corresponding surface of the object receiving the plane wave to increase penetration of the wave into the object.

Also described herein is a process for producing an apparatus for electromagnetic characterisation of internal features of an object, the process including:

(i) providing a source of electromagnetic energy; and
 (ii) forming a body of a first material with openings therein, the first material having a first permittivity and the openings being configured such that when the openings contain one or more predetermined second materials having respective second permittivities different to the first permittivity, a resulting spatial configuration of permittivities forms a graded refractive index lens, wherein an electromagnetic wave incident upon a first surface of the lens as a spherical wave exits a second surface of the lens as a plane wave, and a corresponding refractive index of the lens at the second surface of the lens matches a corresponding refractive index of a corresponding surface of the object receiving the plane waves so that a matching medium is not required.

BRIEF DESCRIPTION OF THE DRAWINGS

Some embodiments of the present invention are hereinafter described, by way of example only, with reference to the accompanying drawings, wherein.

DETAILED DESCRIPTION

Embodiments of the present invention include an apparatus for electromagnetic characterisation of internal features of an object, and a process for producing such an apparatus. The apparatus includes a lens composed of a first material with openings therein containing a second material (and in some embodiments multiple second materials). The materials have different permittivities, and the openings and permittivities are configured such that the lens has a graded refractive index wherein an electromagnetic wave incident upon a first surface of the lens as a spherical wave exits a second surface of the lens substantially as a plane wave, and a corresponding refractive index of the lens at the second surface of the lens matches a corresponding refractive index of a corresponding surface ('the receiving surface') of the object receiving the plane wave to increase penetration of the plane wave into the object.

In some embodiments, the lens is in the form of a planar sheet or 'slab' of the first material with cylindrical openings therein, arranged in layers. However, in general the lens and the openings within it can have arbitrary shapes. The dielectric properties of each layer of the lens are controlled by filling the openings with one or more selected materials (typically fluids) and/or by selecting the sizes and/or spatial arrangements of the openings (e.g., by selecting the radii of the cylindrical openings) to provide a gradual transition of the electromagnetic wave from air to non-air media while collimating the wave along a desired direction. In general, the effective permittivity of a layer (or other region) of the lens can be controlled by appropriate selections of the permittivity of the first material, the permittivity of the second material (or permittivities where multiple second materials are used), and the spatial configuration of the second material(s) within the first material. Typically, the permittivities of the first and second materials are selected to be substantially different. For example, the first material may be a high permittivity material and the second material a low permittivity material, or vice-versa. Suitable selections for the first and second materials will be apparent to those skilled in the art in light of this disclosure.

GRadient INdex ("GRIN") lenses are formed by engineering a refractive index gradient inside the lens. Unlike conventional lenses, they can be designed in flat shapes and tailored to transfer the incident wave to a plane wave moving in a desired direction. Previously, GRIN lenses have generally been built using a stack of dielectric materials with different permittivity values selected on the basis of radiation requirements. However, GRIN-lenses have not previously been used in a medium matched configuration for NDT (including electromagnetic medical diagnostic applications), for several reasons. In particular, NDT applications generally operate at low microwave frequencies, requiring physically large lenses that are impractical for compact systems or where there is limited work space. Consequently, they have not been considered useful at frequencies below 10 GHz, and to compensate for the resulting high absorption rates at high frequencies, the electromagnetic sources are operated at increased power to achieve the desired penetration of the electromagnetic wave into the object being analysed. However, high powers cannot be used in some NDT applications, such as medical diagnostic applications, which require shielding and compliance with safety regulations. Additionally, lens structures are generally regarded as focusing structures, and have only been regarded as meaningful for frequencies in the K-band and above (i.e., above 18 GHz).

Figure 1:
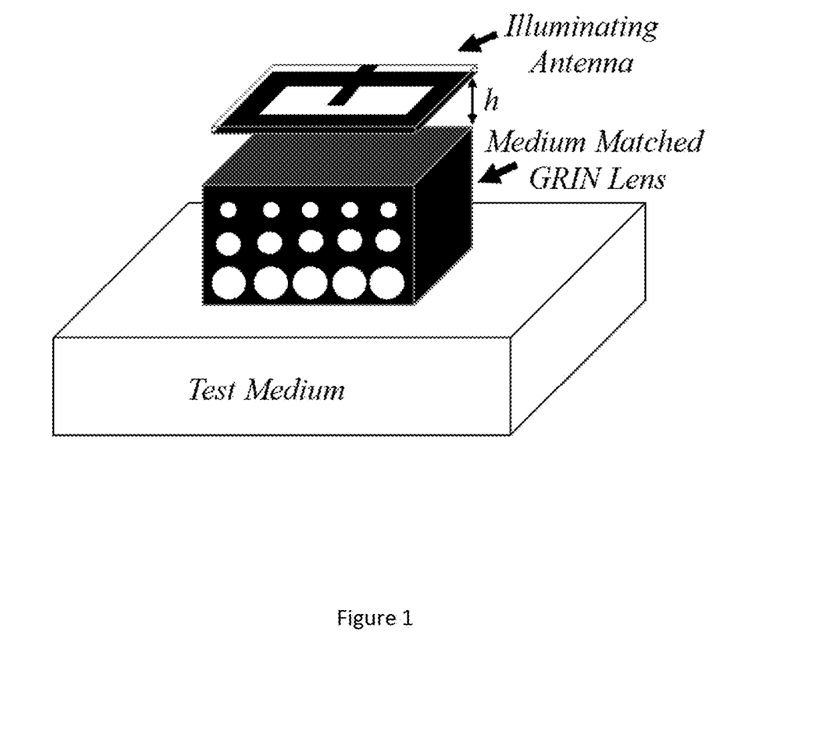
FIG. 1 is a schematic diagram of a graded index ("GRIN") lens in accordance with an embodiment of the present invention, disposed between an illuminating antenna and an object or medium to be assessed or imaged.
Figure 2:
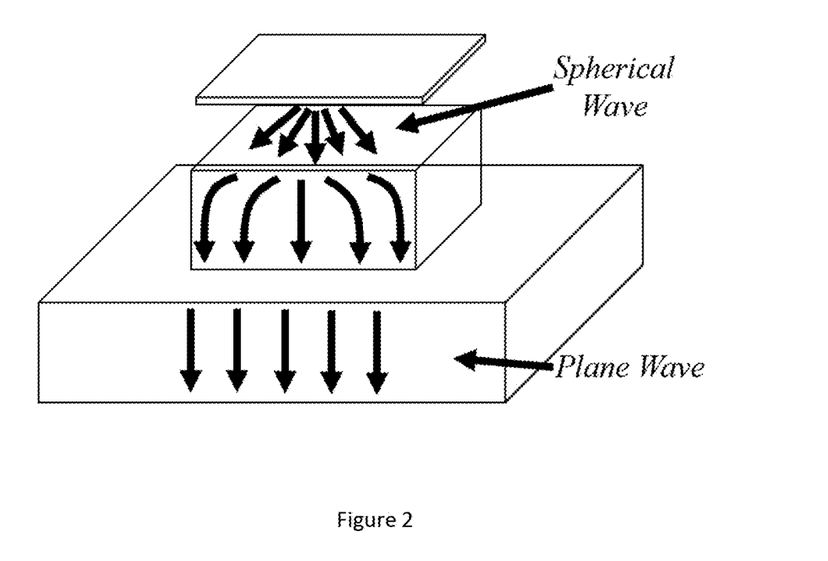
FIG. 2 is a schematic diagram illustrating the operating principle of the GRIN lens of FIG. 1 in transitioning an electromagnetic wave from a spherical wave to a plane wave.

The described embodiments of the present invention include GRIN lenses with lens layers configured to maximise signal transmission from an antenna into the object under investigation by way of a gradual transition of the spherical wave from air through the gradient permittivity layers to a plane wave at the object, as shown schematically in FIGS. 1 and 2.

Figure 3:
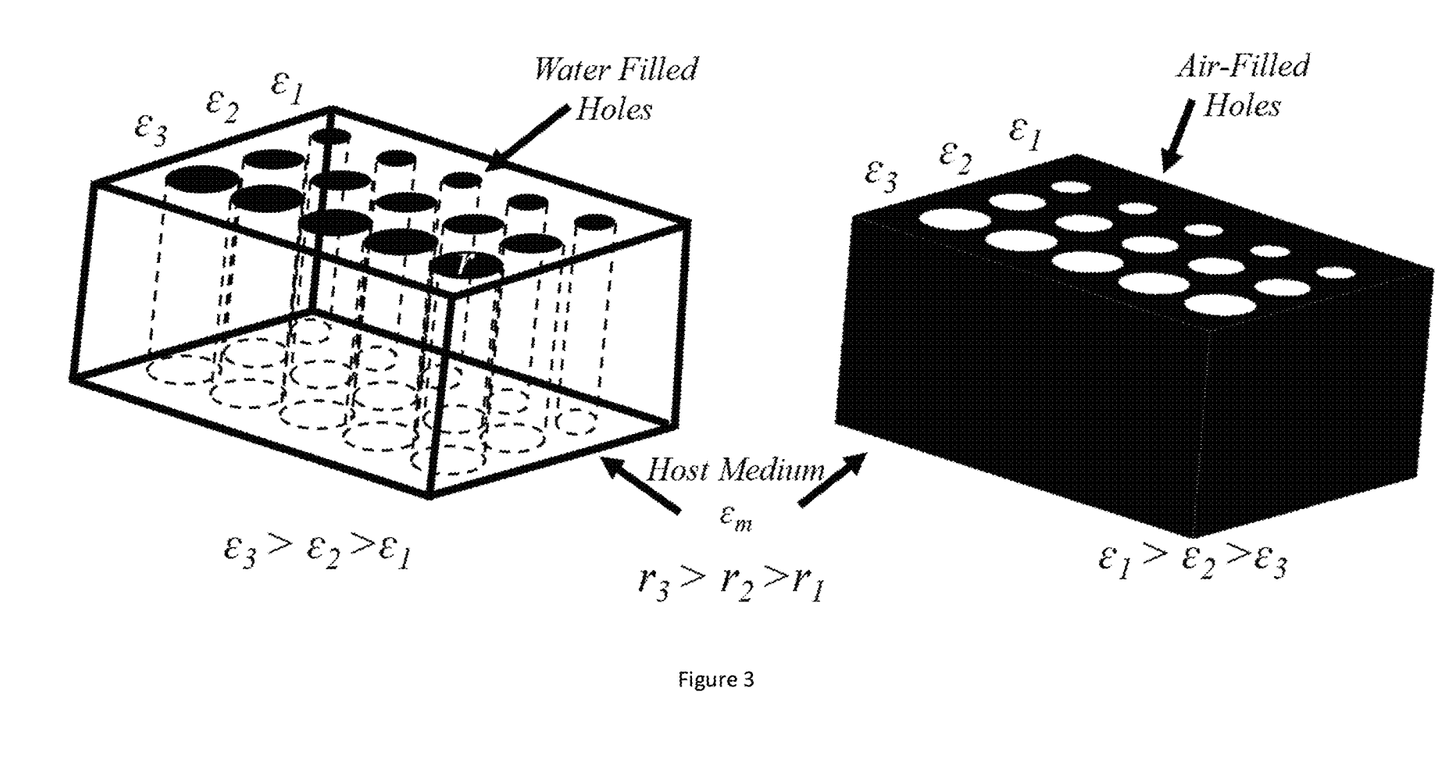
FIG. 3 is a schematic diagram showing a GRIN lens, as initially formed (right-hand side) as a body of a host material with layers of empty (i.e., air filled) cylindrical openings of different radii, and (left-hand side) after filling the openings with a liquid (e.g., water) having a permittivity different from that of the host material.
Figure 16:
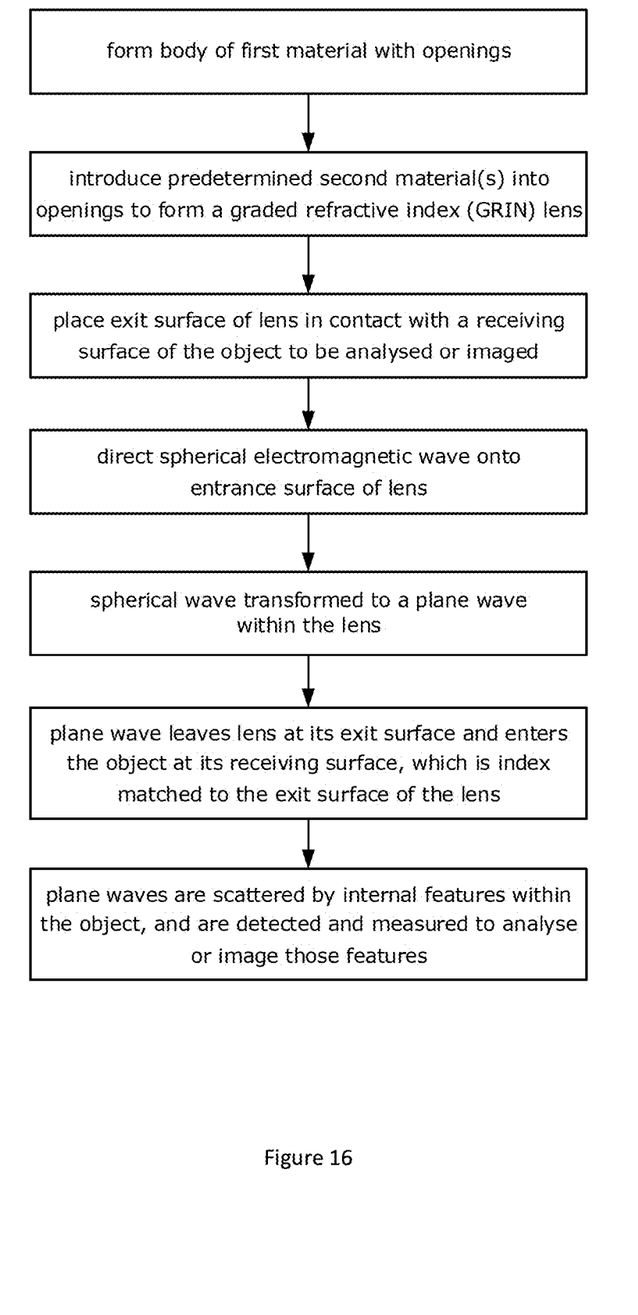
FIG. 16 is a flow diagram of a process for electromagnetic characterisation of internal features of an object in accordance with the described embodiments of the present invention, including steps of a process for producing an apparatus for electromagnetic characterisation of internal features of an object.

As shown in FIG. 16, a process for electromagnetic characterisation of internal features of an object includes steps for producing a specific lens structure/configuration for a given electromagnetic wave frequency and object, and steps for using the resulting apparatus to analyse or image those features. In the described embodiments, the lens structure is produced using 3D printing technology, and takes the form of a planar slab having multiple openings in the form of cylinders open at one end, as shown in FIG. 3. To reduce the fabrication cost for mass production applications, the lens can be formed from a 3D printing material. It will be apparent to those skilled in the art that the lens structure can be formed from a low or a high permittivity material. The resulting 'perforated' structure allows the permittivity of the lens to be graded and controlled by filling the holes with a high permittivity filling material (e.g., water) to increase the permittivity, or a low permittivity material (e.g., Glycerin) to decrease the permittivity (relative to the lens material) or by leaving them empty (i.e., so that they are filled with air). Moreover, the perforated structure also facilitates the formation of a GRIN lens by gradient design of the dielectric properties of different layers of the lens independently. This can easily be achieved by changing the sizes of the openings (in this example by changing the radii of the cylindrical openings) and/or the filling material, which can be a solid, a liquid, or a gas.

Figure 4:
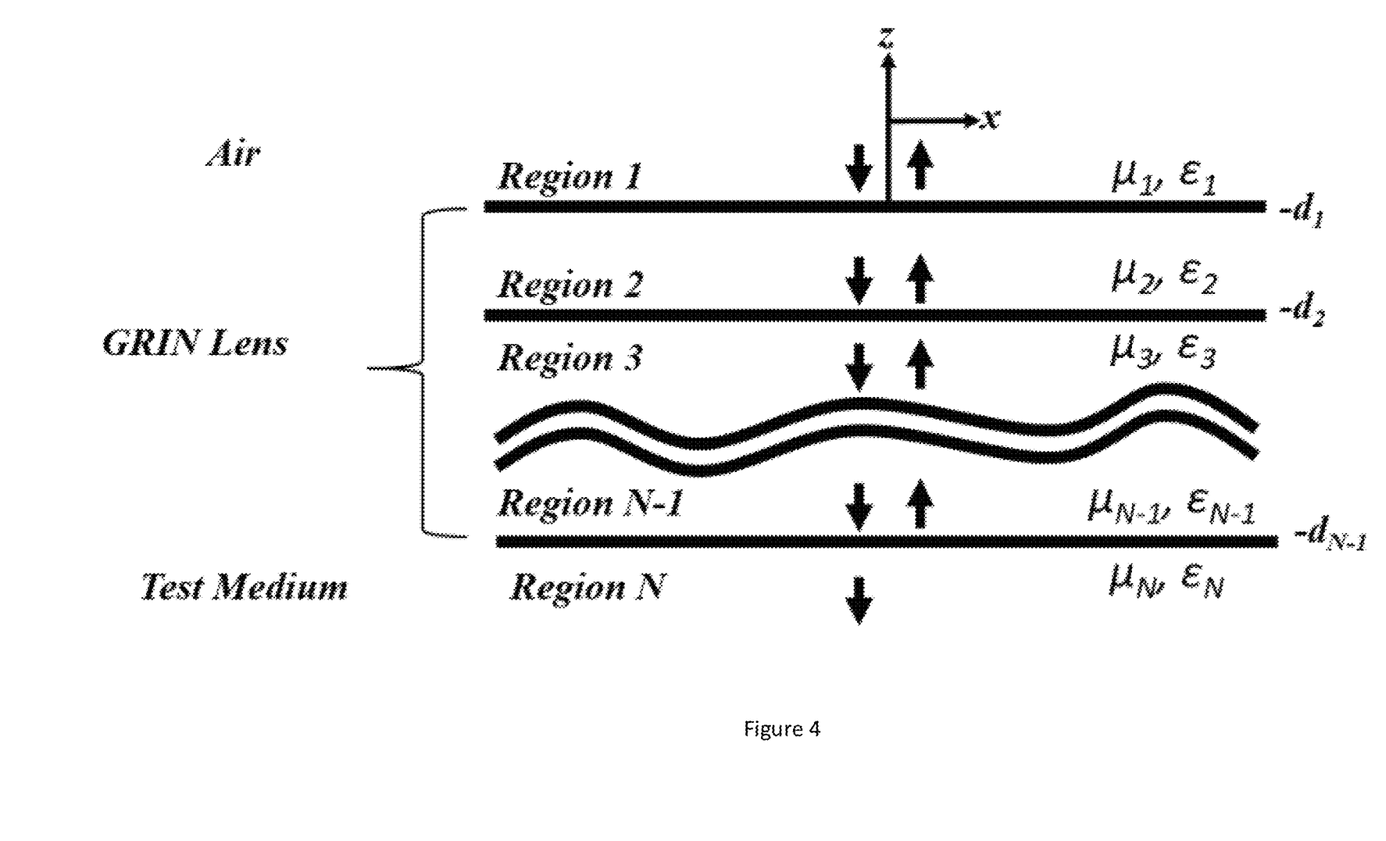
FIG. 4 is a schematic cross-sectional side view of a multilayer GRIN lens with N different layers of respective thicknesses (corresponding to distances $d_i$ from the lens surface) and permittivities $\varepsilon_i$.

To design a medium-matched GRIN lens, it is essential to understand the behaviour of wave propagation inside a multi-layer medium with different dielectric properties. The theory of multi-layer wave propagation in a general form is thoroughly explained in Chew, Weng Cho, Waves and fields in inhomogeneous media, IEEE press, 1995 ("Chew"), and is analysed using generalized reflection and transmission coefficients. To utilize this theory and develop a design procedure, a multilayer structure is considered, as shown in FIG. 4. This structure is comprised of N-layers, in which each layer has a permittivity of $\varepsilon_i$, and $d_i$ is the distance from the surface of the structure to the interface between layer i and i+1. In FIG. 4, Region 1 represents air, and Region N represents the object or medium under test. To simplify the analysis of the wave behaviour, it is assumed that the incident wave has TE-polarization and a normal incidence angle.

The generalized reflection coefficient is defined as the ratio of the reflected wave amplitude to the incident wave amplitude at distance $d_1$ from the surface, whereas the generalized transmission coefficient is the ratio of transmitted wave amplitude in Region N to the incident wave at Region 1. As described in Chew, the generalized reflection coefficient is obtained using following formula:

$$\tilde{R}_{i,i+1} = R_{i,i+1} + \frac{T_{i,i+1}\tilde{R}_{i+1,i+2}T_{i+1,i}e^{2ik_{i+1,z}(d_{i+1}-d_i)}}{1 - R_{i+1,i}\tilde{R}_{i+1,i+2}e^{2ik_{i+1,z}(d_{i+1}-d_i)}} \quad (1)$$

$$i = 1, 2, \ldots, N-1,$$

where $R_{i,i+1}$ and $R_{i+1,i}$ are the Fresnel reflection coefficients for the interface between layers i and i+1 and vice versa, which can be defined as:

$$R_{i,i+1} = \frac{\mu_0 k_{iz} - \mu_0 k_{i+1z}}{\mu_0 k_{iz} + \mu_0 k_{i+1z}}, \quad (2)$$

$$R_{i,i+1} = \frac{\mu_0 k_{i+1z} - \mu_0 k_{iz}}{\mu_0 k_{i+1z} + \mu_0 k_{iz}}, \quad (3)$$

where $$k_{iz} = \sqrt{\omega^2 \mu_0 \varepsilon_i}. \quad (4)$$

In Equation (1), $T_{i,i+1}$ and $T_{i+1,i}$ are the Fresnel transmission coefficients for the interface between layers i and i+1 and vice versa, which are defined as:

$$T_{i,i+1} = \frac{2\mu_0 k_{iz}}{\mu_0 k_{iz} + \mu_0 k_{i+1z}}, \quad (5)$$

$$T_{i,i+1} = \frac{2\mu_0 k_{i+1z}}{\mu_0 k_{i+1z} + \mu_0 k_{iz}}. \quad (6)$$

The generalized transmission coefficient is defined as:

$$\tilde{T}_{1N} = \prod_{j=1}^{N-1} e^{ik_{jz}(d_j - d_{j+1})} S_{j,j+1} \quad (7)$$

where S is given by:

$$S_{i-1,i} = \frac{T_{i-1,i}}{1 - R_{i,i-1}\tilde{R}_{i,i+1}e^{2ik_{iz}(d_i - d_{i-1})}} \quad (8)$$

Design Procedure:

The ultimate aim of the theoretical analysis of the lens structure is to determine the optimum values of $d_i$ and $\varepsilon_i$ to minimise the generalized reflection coefficient at the air-lens interface, and to maximize the generalized transmission coefficient from the air to the target medium (the $N^{th}$ layer). The first step in the design procedure is to set the number of layers to form the GRIN lens, which involves a trade-off between the complexity of the lens and the number of degrees of freedom for designing the matching-lens, since increasing the number of layers provides a smoother transition. The next step is to determine initial values for the permittivity and the thickness of each layer. At this stage, the permittivity (epsilon) values are set in a manner to have rising values from the permittivity of air ($\varepsilon_0 = \varepsilon_1 = 1$) to the permittivity of the target medium (i.e., $\varepsilon_1 < \varepsilon_2 < \ldots < \varepsilon_N$). The optimum theoretical thickness and permittivity values are determined by optimising the generalized reflection and transmission coefficients using a standard optimization method. Although a genetic algorithm was used in the described embodiments, alternative suitable optimization methods will be apparent to those skilled in the art. As the field radiated by the excited feed of an antenna is equivalent to plane waves with different incident angles (see FIG. 2), the values for the case of normal incidence are used as the initial design parameters. At the next step, the final values for permittivity and the thickness of the layers are optimized by minimizing the return loss of the antenna and maximizing penetration into the target object or medium; for example, using a simulator such as CST microwave studio or Ansys Electronic Desktop.

The conventional way of fabricating layers with the resulting permittivity values is to use existing ceramics or high permittivity dielectrics. However, this limits the permittivity values to those of the available prefabricated ceramics/dielectrics. Moreover, it limits the practicality and flexibility of the lens to certain shapes such as flat surfaces. To alleviate this problem, the permittivity values are obtained by providing openings or holes in an otherwise homogenous medium, as shown in FIG. 3. These holes are filled with water or other suitable materials (most conveniently, fluids) to provide the desired permittivity values. For example, as described in Mei, Zhong Lei, Jing Bai, and Tie Jun Cui, "Gradient index metamaterials realized by drilling hole arrays", Journal of Physics D: Applied Physics 43.5 (2010): 055404, the effective permittivity of each layer of the structure depicted in FIG. 3 can be approximated as:

$$\varepsilon_{\mathit{eff}} = \varepsilon_m f_1 + \varepsilon_h f_2 \quad (9)$$

where $\varepsilon_m$ is the permittivity of the host medium (e.g., Polylactic acid), $\varepsilon_h$ is the permittivity of the second (introduced) material (e.g., water), and $f_1$ and $f_2$ are the fractional volumes of the host and second materials, respectively.

The resulting lens can be used to: 1) increase penetration depth, 2) modify the intensity of the electric-field in a desired direction, and 3) focus the energy in a specific region within the target object/medium. Moreover, because the permittivity of the layers can be easily controlled using fluid fillings, the exit surface of the lens can be non-planar to allow it to conform to a corresponding complementary non-planar (e.g., curved) receiving surface of the object under test, avoiding any need for a matching medium between the lens/antenna and the object.

Example I—Industrial Applications

Figure 5:
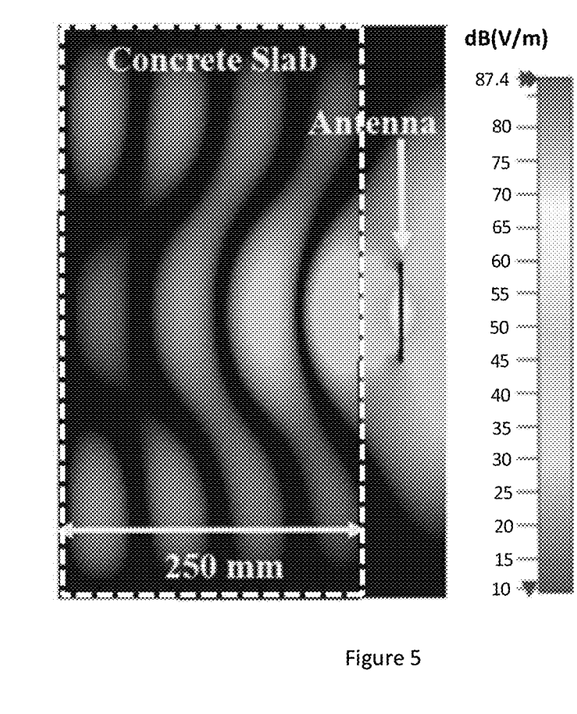
FIGS. 5 and 6 are respective cross-sectional side views of a simulated model of a concrete slab of thickness 250 mm being irradiated by electromagnetic waves at 1 GHz emitted from an antenna, respectively without and with a two-layer GRIN lens (configured to match the permittivity of the concrete) disposed between the antenna and the slab, where the electric field intensity inside the concrete slab is represented in a grey scale.
Figure 6:
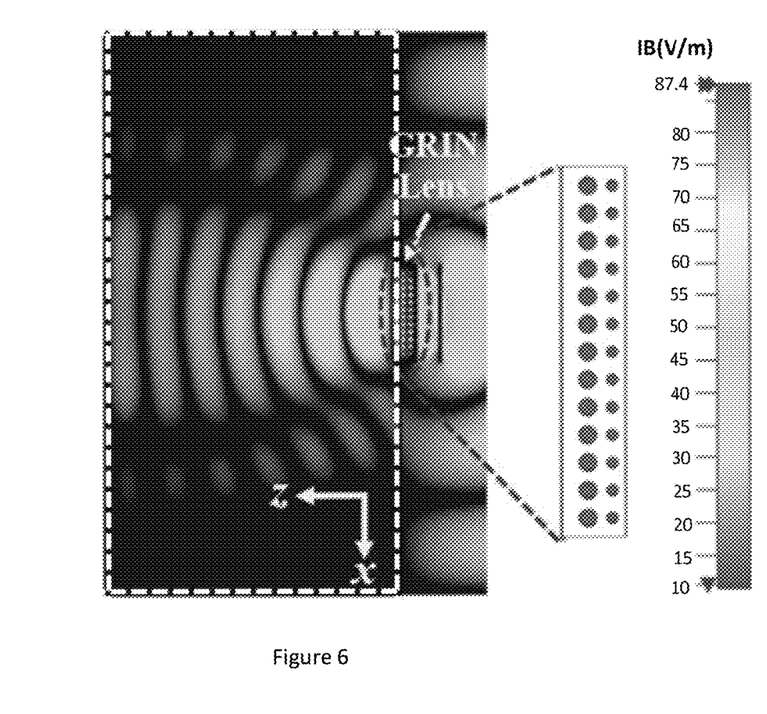
Figure 7:
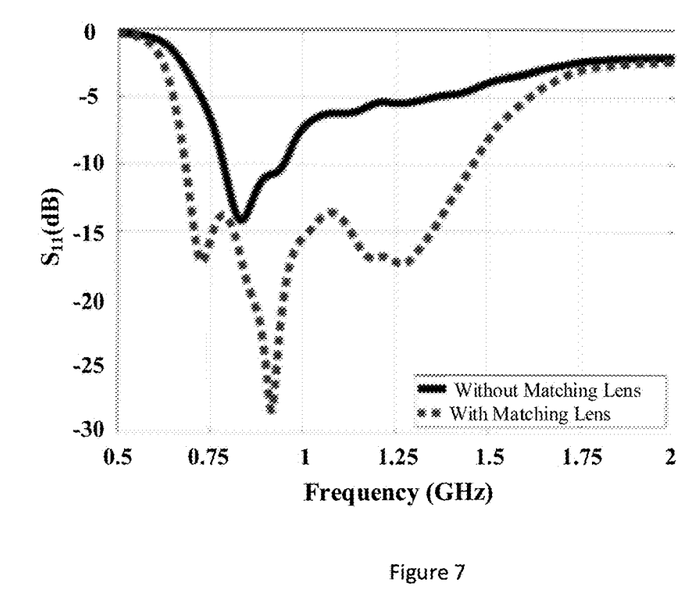
FIG. 7 is a graph of the reflected wave coefficient ($S_{11}$) as a function of electromagnetic wave frequency, with and without the GRIN lens of FIG. 6.
Figure 8:
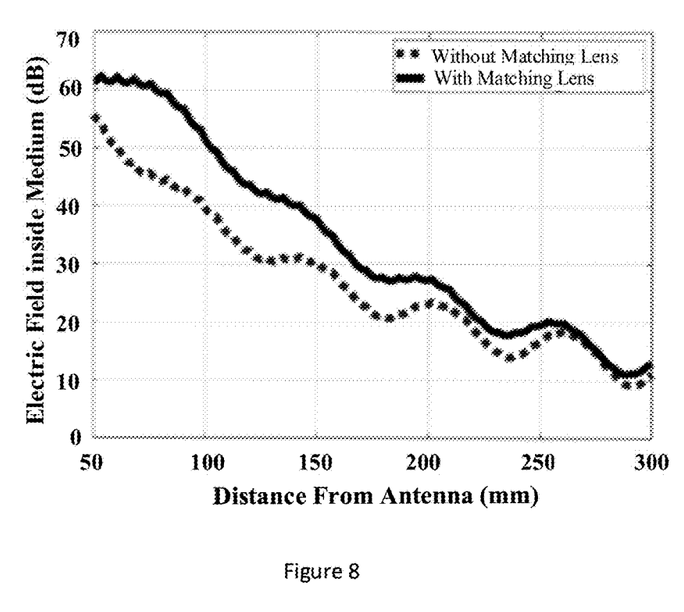
FIG. 8 is a graph of the electric field intensity within the concrete slab as a function of the distance of the slab from the antenna, with and without the GRIN lens of FIG. 6.

The simplest scenario in NDT is that the object under investigation is illuminated by an antenna/sensor without any matching medium. This is generally not problematic if the dielectric properties of the object are identical to those of the air. However, if the medium has higher permittivity (e.g., concrete with $\varepsilon_r = 4.7$ @ 1 GHz)), then this contrast creates matching problems. To demonstrate this phenomenon, CST Microwave studio was used to model a concrete slab with 250 mm thickness illuminated by a microstrip-fed slot antenna operating at 0.75-1 GHz, and located at a distance of 50 mm from the concrete slab. As shown in FIG. 5, the majority of the illuminated wave is reflected at the air-concrete boundary 502, and only a small portion of the wave penetrates into the concrete. This mismatch is also evident from the reflection coefficient of the antenna, as shown in FIG. 7. Instead of using an external matching medium, a matched GRIN-lens with 11 openings in each of two layers was directly placed on the test object and radiated by the antenna. Following the design and production procedure described above, the resulting optimised two-layer GRIN lens has hole diameters of $r_1$=2.2 mm and $r_2$=3.45 mm, with respective spacings between adjacent openings of 6.9 mm and 4.4 mm. The ultimate goal of the design in this instance was to maximize the electric field intensity at the centre of the concrete slab to enable the characterisation or imaging of the deepest target features (e.g., cracks) within the slab by applying the GRIN lens to opposite surfaces of the slab. The permittivity values were calculated for each layer composed of perforated Polylactic Acid, in which the openings were filled with water (See inset of FIG. 6). The opening diameters and the spacing between the layers of openings were then optimized using a genetic algorithm in the CST software. In general, the number of openings should be large enough to at least cover the aperture of the exciting antenna, e.g., the width of a slot antenna. As shown in FIG. 8, the lens improves the intensity of the electric field at the centre of the slab (z=175 mm) by 8 dB (V/m). Moreover, FIG. 8 also reveals that the intensity of the electric field can be improved up to 15 dB inside the slab at a depth of z=75 mm. The reflection coefficient of the antenna is also improved over a wide operating frequency range of 0.65-1.4 GHz due to the gradual transition of the permittivity from $\varepsilon_r$=1 to $\varepsilon_r$=4.7 through the layers of the gradient lens.

Example II—Beam/E-Field Steering

In any non-destructive testing scenario, cases arise where the beam of the antenna/sensor is required to be steered to illuminate along a direction other than the boresight direction. In ultrasonic probes, this has been done through mechanical/manual movement by the operator, causing operator and matching-medium related errors, the former errors arising from natural human movements, and the latter ones from the changed thickness of the matching medium. For a matching medium to be effective, it needs to have a consistent thickness at all parts of the interface. This is not achievable with planar sensors on curved surfaces, because they create uneven gaps at touching and non-touching portions of the planar sensor and the surface of the object being investigated.

Figure 9:
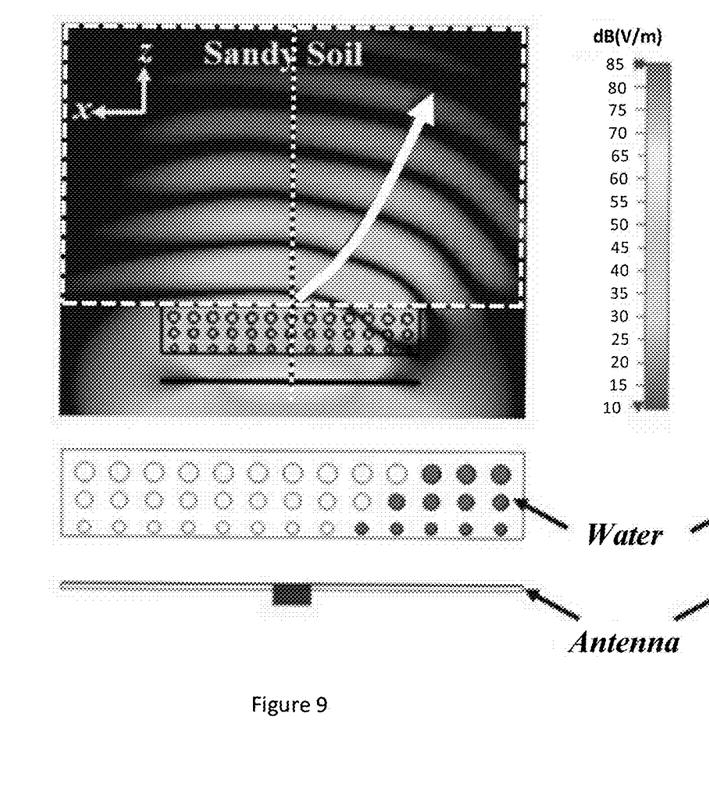
FIGS. 9 and 10 are respective cross-sectional side views of simulated models of a body of sandy soil being irradiated by electromagnetic waves at 1 GHz emitted from an antenna through a three-layer GRIN lens where most of the openings in the lens host material are empty, and only openings respectively at the right and left ends of the lens are filled with water to steer the wave towards that side of the lens.
Figure 10:
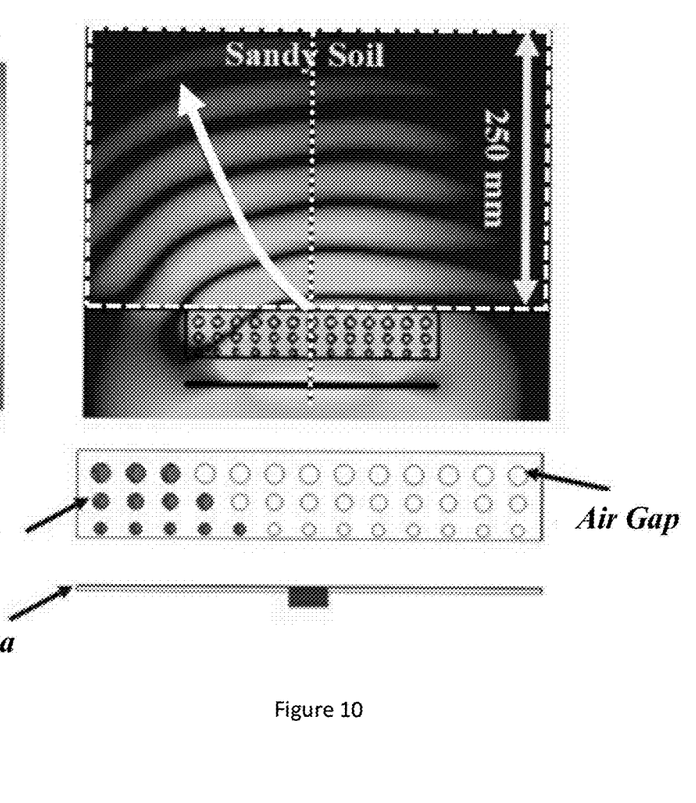

The GRIN lens structure described herein can be configured to change the beam direction by varying the gradient of the lens in a smaller portion of the lens by only filling some of the openings in each layer with water and leaving the other openings empty (i.e., containing air) or filled with a different material having a selected permittivity, allowing the wave to be steered to a desired direction, statically or dynamically. In the static mode, the dielectric properties are selected to be specific for each direction. Conversely, in a dynamic or reconfigurable mode, pumping structures are used to dynamically control the flow of water (or other fluid or non-fluid material). For example, a static lens configuration with two scanning modes is shown in FIGS. 9 and 10 for analysing a sandy soil. In this example, the lens had three layers of 11 openings with radii of 3.2 mm, 2.65 mm, 2 mm in the respective layers, and spacings between adjacent openings of 5.1 mm, 6.2 mm, and 7.5 mm in the respective layers. For dynamic steering of the plane wave beam, standard fluid pumps commonly used in the microfluidics and biotech industries can be used to dynamically fill and empty selected ones of the openings.

Example III—Biomedical Applications

Electromagnetic imaging/diagnostic systems for biomedical applications is one of the sub-categories of non-destructive testing that is distinctly different from industrial applications due to the test medium, being the human body. Biomedical applications are strictly regulated to ensure safety precautions. Hence, limitations are imposed on maximum transmittable power levels, chemicals used for medium mixtures, and any direct contact of metallic parts to the human body. To obtain meaningful penetration inside the lossy human body, the antennas are required to operate at lower microwave frequencies around 1 GHz, requiring large antennas that would cover large portions of the body. This creates difficulties for imaging algorithms/signal processing techniques that use differential comparative methods and require two distinctive focused beams that only cover smaller targeted regions of the body (e.g., right and left lobes of the liver), and comparison of the scattered-wave behaviours. Additionally, there are significant differences in the shapes and dielectric properties of different parts of the body that require adjustments to the antenna configuration for optimum operation. Considering the simplicity of adjusting the dielectric properties, and the flexibility of wave propagation tailoring, the lens structures described herein can accommodate all of these requirements.

To demonstrate the effectiveness of the lens structure, a four-layer torso-matched GRIN lens was designed and produced using the process described above. The resulting layers each had 11 cylindrical openings with diameters of $r_1$=1.95 mm, $r_2$=2.55 mm, $r_3$=2.9 mm and $r_4$=3.8 mm in the respective layers, and spacings of 4.2 mm, 5.9 mm, 6.6 mm, and 7.8 in the respective layers.

Figure 11:
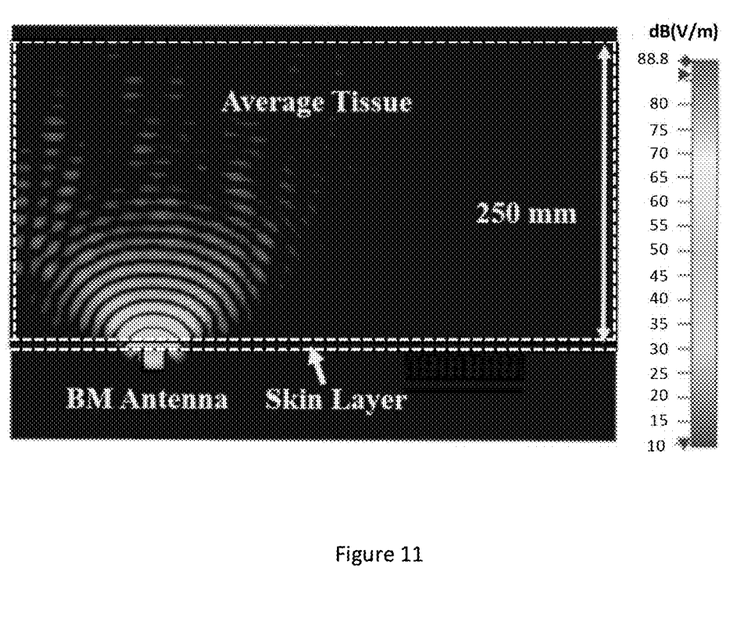
FIGS. 11 and 12 are respective cross-sectional side views of a simulated model of a human torso being irradiated by electromagnetic waves at 1 GHz emitted from a body-matched antenna and a multi-layer GRIN lens, respectively, demonstrating how the GRIN lens is able to form a plane wave that propagates relatively uniformly through the body, in contrast to the rapidly decaying spherical wave from the body-matched antenna.
Figure 12:
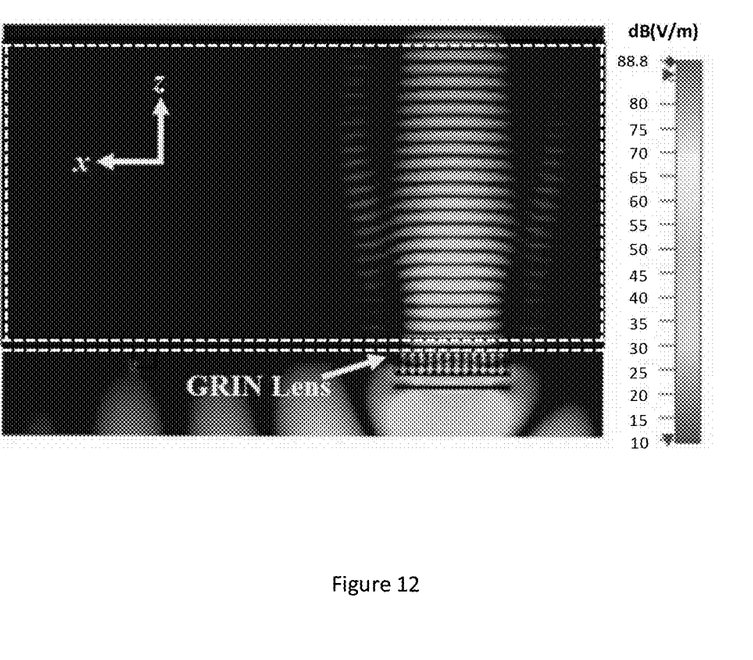

To highlight the difference in the behaviour of the propagated wave, the performance of the GRIN lens is compared to that of a body matched/coupled antenna operating at the same frequency band in FIGS. 11 and 12. The body-matched antennas were designed on a printed circuit board (in this example being composed of FR4) and simulated in the vicinity of a body resembling material. Both antennas were simulated on a two layer structure, where the first layer represents human skin, and the second layer represents the average human tissue properties inside the human torso. Two distinct differences are observed; firstly, the penetration depth is significantly greater, and the strength of the GRIN lens antenna at the centre of the structure at z=175 mm is 35 dB (V/m) stronger than that of the body matched design. Additionally, the wave propagation resulting from using the lens structure occurs in a plane wave manner in FIG. 12 compared to the spherical radiation by the body-matched antenna, as shown in FIG. 11. Together, these factors improve the sensitivity and accuracy of the apparatus to any changes in the tissues inside the body.

Figure 13:
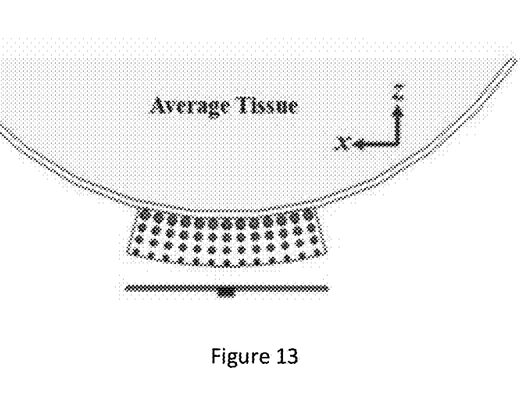
FIG. 13 is a schematic cross-sectional side view of a model of a human torso with a curved 'body matched' GRIN lens conformally disposed thereon and between the torso and an antenna.
Figure 14:
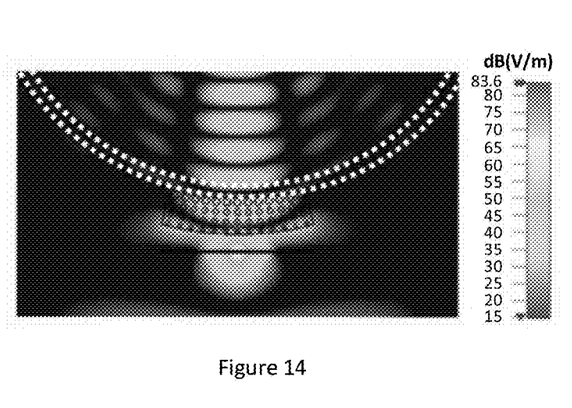
FIG. 14 is a corresponding simulation of the arrangement of FIG. 13, showing the relatively constant electric field intensity within a portion of the torso directly inline with the antenna.
Figure 15:
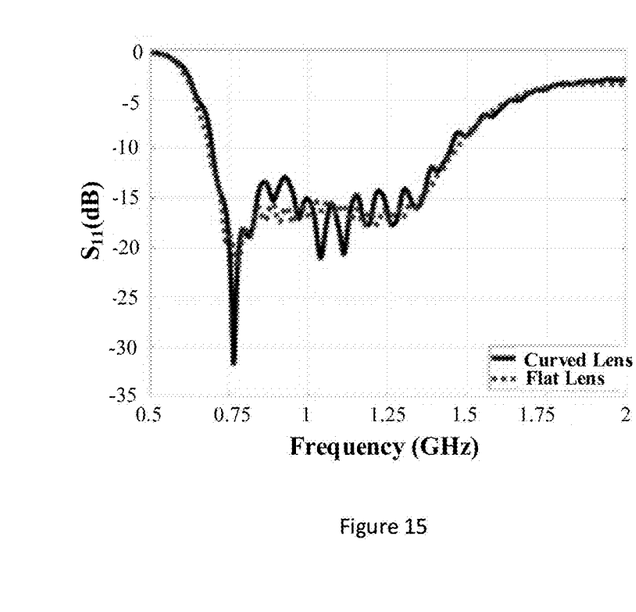
FIG. 15 is a graph of the reflected wave coefficient ($S_{11}$) as a function of electromagnetic wave frequency, with the curved GRIN lens of FIGS. 13 and 14, and a corresponding index-matched but planar GRIN lens.

To emphasize the capabilities of the lens structures described herein, a lens having a curved exit surface was produced to conform to the shape of a subject's torso region, as shown in FIG. 13. This was done to avoid reflections that would otherwise result from any gap between a flat lens exit surface and the curvature of the human body. The intensity of the electric field, as shown in FIG. 14, and the reflection coefficient, as shown in FIG. 15, of the curved structure remain strong and uninterrupted.

It will be apparent from the description above that the medium-matched GRIN lenses described herein achieve the following important requirements of NDT testing:

(i) Non-destructive systems can be optimized and custom built for any application by only changing the dielectric properties of the lens. This can be simply achieved by changing the number of layers of openings, the sizes and their spatial arrangements of the openings in the lens medium, and the volume ratio of air/water (or other materials) in each opening.

(ii) The lenses can be cheaply and easily fabricated using 3D printing technology, significantly reducing maintenance and replacement costs.

(iii) The reflection at the air/medium interface is reduced or eliminated due to the gradual transformation of the spherical wave to a plane wave. Hence the penetration depth is increased without the need for any refractive index matching medium.

(iv) Due to the collimation of the EM waves by the lens, and the gradually increasing refractive index (matched lens), the intensity of the electric field inside the target medium is increased. Hence, the scattered signals from the medium are received with improved signal to noise ratio (SNR).

(v) Unlike conventional NDT testing setups, the permittivity of the lens can be adjusted to maintain its performance for non-flat surfaces and to conform to the shape of the target medium.

(vi) The intensity of the electric field inside the target medium can be steered in different directions by simply varying the material (e.g., water to air gap) ratio in different directions.

Many modifications will be apparent to those skilled in the art without departing from the scope of the present invention.

The invention claimed is:

1. An apparatus for electromagnetic characterisation of internal features of an object, the apparatus including a lens for placement between a source of electromagnetic energy and the object, the lens being composed of a first material having a first permittivity with openings therein containing or configured to receive one or more second materials having respective second permittivities different to the first permittivity, the openings being configured such that, when the openings contain the one or more second materials, the lens has a graded refractive index wherein an electromagnetic wave generated by the source and incident upon a first surface of the lens as a spherical wave exits a second surface of the lens in contact with a receiving surface of the object substantially as a plane wave, and a refractive index of the lens at the second surface of the lens substantially matches a refractive index of the object at the receiving surface to increase penetration of the plane wave into the object.

2. The apparatus of claim 1, wherein the openings contain the one or more second materials.

3. The apparatus of claim 1, wherein the second surface of the lens has a non-planar shape that conforms to the receiving surface of the object.

4. The apparatus of claim 3, wherein the one or more second materials include at least one material having a permittivity greater than the first permittivity.

5. The apparatus of claim 3, wherein the one or more second materials include at least one material having a permittivity less than the first permittivity.

6. The apparatus of claim 1, wherein the second materials are arranged in the openings so that the plane wave is deflected from its direction of incidence at the receiving surface of the object and travels along a different direction within the object.

7. The apparatus of claim 1, wherein the object is a body part.

8. The apparatus of claim 1, wherein the first material is a 3d printing material, and the one or more second materials include water.

9. The apparatus of claim 1, wherein the openings in the first material are arranged in layers.

10. The apparatus of claim 9, wherein the openings are cylindrical openings, and the cylindrical openings in each layer have the same corresponding radius, and the cylindrical openings in respective different layers have respective different radii.

11. A process for producing an apparatus for electromagnetic characterisation of internal features of an object, the process including forming a body of a first material with openings therein, the first material having a first permittivity and the openings being configured such that, when the openings contain one or more predetermined second materials having respective second permittivities different to the first permittivity, a resulting spatial configuration of permittivities forms a graded refractive index lens, wherein an electromagnetic wave incident upon a first surface of the lens as a spherical wave exits a second surface of the lens in contact with a receiving surface of the object substantially as a plane wave, and a refractive index of the lens at the second surface of the lens substantially matches a refractive index of the object at the receiving surface so that a matching medium is not required.

12. The process of claim 11, including introducing the one or more predetermined second materials into the openings in the first material.

13. The process of claim 11, including introducing the one or more predetermined second materials into corresponding selected ones of the openings in the first material to direct the plane wave along a specific direction within the object.

14. The process of claim 11, including dynamically controlling the introduction and removal of the one or more predetermined second materials into and from corresponding selected ones of the openings in the first material to dynamically steer the plane wave along different directions within the object.

15. The process of claim 11, wherein the body of the first material is formed such that the second surface of the lens has a non-planar shape that conforms to the receiving surface of the object.

16. The process of claim 11, wherein the step of forming including 3D printing the body of the first material with openings therein.

17. The process of claim 11, including determining the configuration of the openings using an optimisation process that maximises a transmission coefficient of the lens while minimising a reflection coefficient of the lens.

* * * * *